(12) United States Patent
Nolz

(10) Patent No.: US 11,022,536 B2
(45) Date of Patent: Jun. 1, 2021

(54) METHOD FOR OPERATING A SENSOR ELEMENT FOR DETECTING PARTICLES OF A MEASURING GAS IN A MEASURING GAS CHAMBER

(71) Applicant: Robert Bosch GmbH, Stuttgart (DE)

(72) Inventor: Daniel Nolz, Rechberghausen (DE)

(73) Assignee: Robert Bosch GmbH, Stuttgart (DE)

( * ) Notice: Subject to any disclaimer, the term of this patent is extended or adjusted under 35 U.S.C. 154(b) by 117 days.

(21) Appl. No.: 16/344,408

(22) PCT Filed: Oct. 23, 2017

(86) PCT No.: PCT/EP2017/076985
§ 371 (c)(1),
(2) Date: Apr. 24, 2019

(87) PCT Pub. No.: WO2018/095670
PCT Pub. Date: May 31, 2018

(65) Prior Publication Data
US 2020/0049610 A1    Feb. 13, 2020

(30) Foreign Application Priority Data

Nov. 23, 2016   (DE) .......................... 102016223069.7

(51) Int. Cl.
*G01N 15/06* (2006.01)
*G01N 15/00* (2006.01)

(52) U.S. Cl.
CPC ..... *G01N 15/0656* (2013.01); *G01N 15/0606* (2013.01); *G01N 2015/0046* (2013.01)

(58) Field of Classification Search
CPC ........... G01N 15/0656; G01N 15/0606; G01N 2015/0046
See application file for complete search history.

(56) References Cited

U.S. PATENT DOCUMENTS

| 2008/0024111 A1* | 1/2008 | Dorfmueller | G01N 15/0656 324/71.4 |
| 2008/0053067 A1* | 3/2008 | Schmidt | G01M 15/102 60/276 |

(Continued)

FOREIGN PATENT DOCUMENTS

| DE | 101 49 333 A1 | 5/2003 |
| DE | 103 19 664 A1 | 11/2004 |

(Continued)

OTHER PUBLICATIONS

International Search Report for PCT/EP2017/076985, dated Feb. 19, 2018.

*Primary Examiner* — Benjamin R Schmitt
(74) *Attorney, Agent, or Firm* — Norton Rose Fulbright US LLP; Gerard Messina

(57) ABSTRACT

A method for operating a sensor element for detecting particles of a measuring gas in a measuring gas chamber is provided. The sensor element includes a support and at least one measuring electrode that is connected to the support and that may be exposed to the measuring gas. The method includes the following steps: a) carrying out a first regeneration of the sensor element at a first regeneration temperature; b) carrying out a first diagnostic measurement at the measuring electrode; and c) carrying out at least one of the following steps based on a result of the first diagnostic measurement: c1) outputting an error message; c2) carrying out a measuring phase for detecting the particles of the measuring gas; or c3) carrying out a second regeneration of the sensor element at a second regeneration temperature.

8 Claims, 1 Drawing Sheet

(56) References Cited

U.S. PATENT DOCUMENTS

| | | |
|---|---|---|
| 2011/0109331 A1 | 5/2011 | Nelson et al. |
| 2011/0285410 A1 | 11/2011 | Aoki |
| 2013/0000678 A1 | 1/2013 | Hocken et al. |
| 2013/0002271 A1 | 1/2013 | Hocken et al. |

FOREIGN PATENT DOCUMENTS

| | | |
|---|---|---|
| DE | 103 53 860 A1 | 6/2005 |
| DE | 10 2006 042 362 A1 | 3/2008 |
| WO | 2003/006976 A2 | 1/2003 |

\* cited by examiner

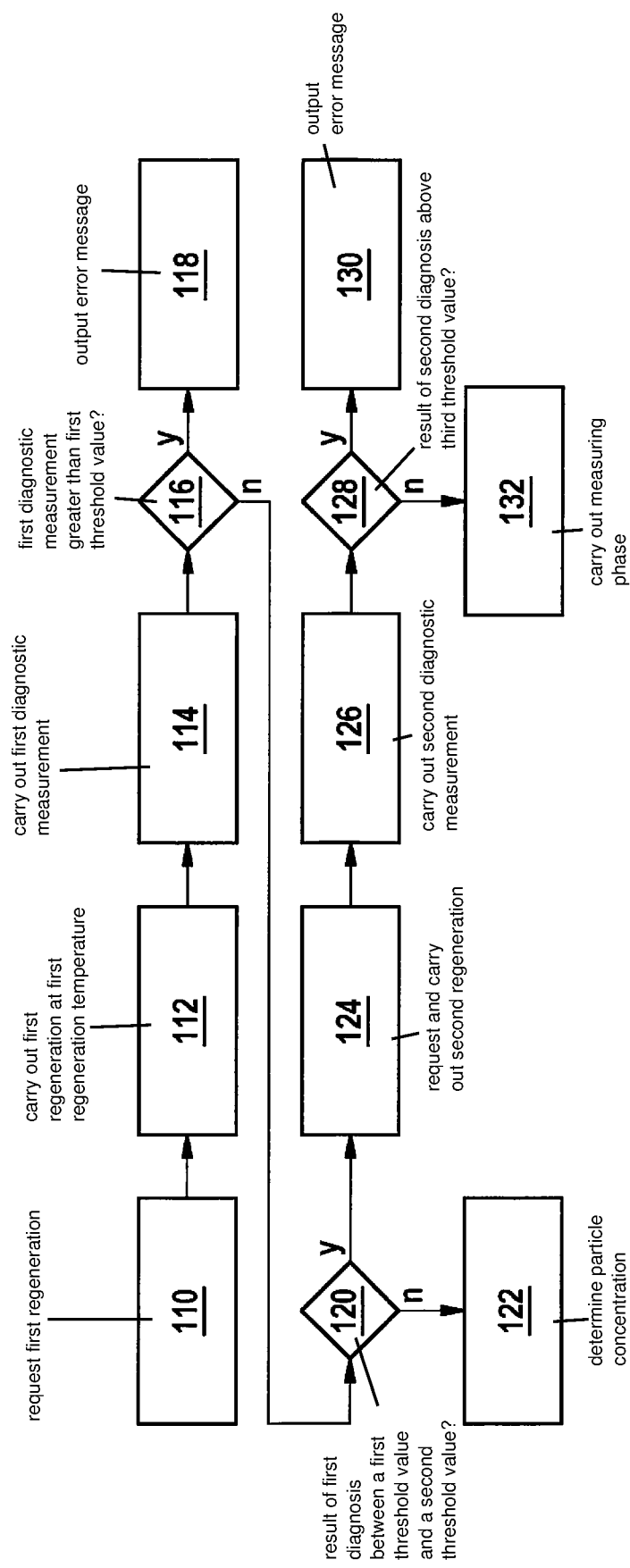

METHOD FOR OPERATING A SENSOR ELEMENT FOR DETECTING PARTICLES OF A MEASURING GAS IN A MEASURING GAS CHAMBER

BACKGROUND INFORMATION

Numerous sensor elements for detecting particles of a measuring gas in a measuring gas chamber are available. For example, the measuring gas may be an exhaust gas of an internal combustion engine. In particular, the particles may be soot or dust particles. The present invention is described below, without limitation of further specific embodiments and applications, in particular with reference to sensor elements for detecting soot particles.

Two or more metallic electrodes may be mounted on an electrically insulating support. In a collecting phase of the sensor element, the particles, in particular the soot particles, that accumulate under the effect of a voltage form electrically conductive bridges between the electrodes, designed, for example, as interdigital electrodes that mesh together in a comb-like manner, and thus briefly short circuit the electrodes. In a regenerating phase the electrodes are generally burned free with the aid of an integrated heating element. The particle sensors typically evaluate the electrical properties of an electrode structure that are changed due to the particle accumulation. For example, a decreasing resistance or an increasing current may be measured at a constant applied voltage. Sensor elements that operate according to this principle are generally referred to as resistive sensors, and exist in numerous specific embodiments, as described in German Patent Application Nos. DE 103 19 664 A1, DE 10 2006 042 362 A1, DE 103 53 860 A1, and DE 101 49 333 A1, and PCT Application No. WO 2003/006976 A2, for example. The sensor elements designed as particle sensors or soot sensors are customarily used for monitoring diesel particle filters. In the exhaust tract of an internal combustion engine, the particle sensors of the described type are generally accommodated in a protective tube, which at the same time allows the exhaust gas to flow through the particle sensor.

In the regenerating phase or regeneration phase, prior to a measurement the particle sensors are heated to approximately 785° C., for example. As a result, the at least one measuring electrode, for example the interdigital electrode (IDE), is brought into a defined, preferably soot-free, state that may be used as the starting point of a particle measurement. Remaining soot residues may skew a subsequent measurement. However, a basic challenge with this method is that heating the sensor elements, in particular the measuring electrode, to the comparatively high temperature for the soot burnoff may cause long-term damage to the measuring electrode, in particular a platinum electrode, in particular since this measuring electrode is generally exposed to the atmosphere.

SUMMARY

Within the scope of the present invention, an example method for operating a sensor element for detecting particles of a measuring gas in a measuring gas chamber is provided. The sensor element encompasses a support and at least one measuring electrode, in particular at least one interdigital electrode, that is connected to the support and that may be exposed to the measuring gas. The example method includes the following described method steps, which may preferably, but do not necessarily have to be, carried out in the described sequence.

In addition, one or multiple method steps may also be carried out simultaneously or overlapping in time. Furthermore, one or multiple method steps or all method steps may be carried out repeatedly. The example method may encompass further method steps besides the described method steps. The example method includes the following steps:
a) carrying out a first regeneration of the sensor element at a first regeneration temperature;
b) carrying out a first diagnostic measurement at the measuring electrode; and
c) carrying out at least one of the following steps based on a result of the first diagnostic measurement:
  c1) outputting an error message;
  c2) carrying out a measuring phase for detecting the particles of the measuring gas; or
  c3) carrying out a second regeneration of the sensor element at a second regeneration temperature.

Within the scope of the present invention, a sensor element is understood to mean any device that is suitable for qualitatively and/or quantitatively detecting the particles, and that, for example with the aid of a suitable control unit and suitably designed electrodes, may generate an electrical measuring signal, for example a voltage or a current, corresponding to the detected particles. The detected particles may in particular be soot particles and/or dust particles. DC signals and/or AC signals may be used. In addition, a resistive component and/or a capacitive component may be used, for example for signal evaluation based on the impedance. With regard to possible designs of the sensor element, reference may be made to the above-mentioned related art, for example. However, other embodiments are also possible.

The sensor element may in particular be configured for use in a motor vehicle. In particular, the measuring gas may be an exhaust gas of the motor vehicle. Other gases and gas mixtures are possible in principle. The measuring gas chamber may basically be any open or closed space in which the measuring gas is accommodated and/or through which the measuring gas flows. For example, the measuring gas chamber may be an exhaust tract of a combustion engine, for example an internal combustion engine.

The sensor element encompasses the support and the at least one measuring electrode that is connected to the support and that may be exposed to the measuring gas. The at least one measuring electrode may in particular be situated on a surface of the support or be accessible for the measuring gas from a surface of the support. The at least one measuring electrode may in particular include a plurality of measuring electrodes, for example at least one first measuring electrode and at least one second measuring electrode. The measuring electrodes may in particular form at least one interdigital electrode, i.e., a structure of two intermeshing measuring electrodes, each including intermeshing electrode fingers. However, some other arrangement of the at least one measuring electrode is possible in principle.

Within the scope of the present invention, a support is basically understood to mean any substrate that is suitable for supporting the at least one measuring electrode, and/or on which the at least one measuring electrode may be mounted. Within the scope of the present invention, a measuring electrode is basically understood to mean any electrical conductor that is suitable for a current measurement and/or a voltage measurement, and/or that may act on at least one element, in contact with the electrode devices, with a voltage and/or a current. Within the scope of the present invention, the term "electrode finger" is basically understood to mean any formation of the measuring electrode whose dimensions in one dimension greatly exceed the dimensions in at least one other dimension, for example at least by a factor of 2, preferably at least by a factor of 3, particularly preferably at least by a factor of 5. Within the scope of the present invention, a plurality is basically understood to mean any number that is at least two.

The at least one measuring electrode may in particular encompass platinum and/or may be completely or partially made of platinum. An alloy is also possible in principle. Other metals may also be used as an alternative or in addition to the use of platinum.

The support may encompass at least one ceramic material as support material. In particular, the support may encompass an oxidic ceramic, preferably aluminum oxide, in particular $Al_2O_3$. However, other oxides, for example zirconium oxide, are possible. In addition, the support may encompass at least one electrically insulating material. The support may have a support surface. Within the scope of the present invention, a support surface is basically understood to mean any layer that demarcates the support from its surroundings, and on which the at least one measuring electrode is mounted.

In general, it is noted that within the scope of the present invention the terms "first", "second," or "third" are used strictly as designations and name assignments, not for numbering. Thus, for example, a first element and a third element may be present without a second element being absolutely necessary, or a second element may be present without a first element being present, or a first element may be present without a second element or a third element being present.

Within the scope of the present invention, regeneration at a regeneration temperature is basically understood to mean heating of the sensor element or a portion thereof to the regeneration temperature, it being possible to use one or multiple regeneration temperatures, which may be fixed or also variable. The at least one regeneration temperature is selected in such a way that the particles are at least partially thermally removed from the at least one measuring electrode. In particular, the at least one regeneration temperature may be above 500° C., for example in a range between 500° C. and 1100° C.

Within the scope of the present invention, a diagnostic measurement at the at least one measuring electrode is understood to mean a measurement in which at least one measured value is ascertained that allows a state of the at least one measuring electrode, in particular the presence of particles on the at least one measuring electrode, to be deduced. In particular, this may be at least one measured electrical value, for example at least one measured electrical value selected from the group made up of a current, a voltage, or a resistance. Thus, for example, the at least one measuring electrode may include two or more measuring electrodes, and the diagnostic measurement may include, for example, a resistance measurement between the at least two measuring electrodes, or alternatively or additionally, a current measurement at a predefined voltage between the at least two measuring electrodes, or alternatively or additionally, a voltage measurement at a predefined current between the at least two measuring electrodes. Various embodiments are possible, and are basically known to those skilled in the art.

Within the scope of the present invention, carrying out one or multiple method steps based on the result of the first diagnostic measurement is generally understood to mean specifically carrying out the one method step or the multiple method steps. The specific carrying out may include one or multiple queries, for example a comparison of the at least one measured value of the diagnostic measurement to at least one threshold value, method steps being selected based on a result of the comparison.

Within the scope of the present invention, an error message is generally understood to mean a signal that allows a device receiving the signal and/or a person receiving the signal to deduce the presence of an error. The signal may be or encompass, for example, an electrical signal, an acoustic signal, an optical signal, or a haptic signal. Correspondingly, outputting an error message is understood to mean a transmission of the signal and/or a provision of the signal.

A measuring phase for detecting the particles of the measuring gas is generally understood to mean an operation in which at least one measuring variable is ascertained that correlates with the particles in the measuring gas. For example, at least one electrical measuring variable may be generated that allows a concentration of the particles in the measuring gas to be deduced. The measuring phase may in particular include a plurality of measurements in a chronological sequence, so that the particle concentration may also be deduced, for example, from a measuring variable in the form of a change in at least one measured value, for example a current between at least two measuring electrodes.

The second regeneration temperature may in particular be higher than the first regeneration temperature. In particular, the second regeneration temperature may be, for example, at least 50° C., preferably at least 70° C., above the first regeneration temperature. For example, the first regeneration temperature may be 650-730° C., in particular 690° C. In addition, the second regeneration temperature may, for example, be 745-825° C., in particular 785° C. For example, the first regeneration temperature may be 690° C., and the second regeneration temperature may be 785° C. However, other values are also possible in principle.

The first diagnostic measurement may in particular include a shunt diagnosis between at least two of the measuring electrodes. A shunt diagnosis is generally understood to mean a method in which at least one measured value is generated that allows an electrical shunt between the at least two measuring electrodes to be deduced. The shunt diagnosis may generally include, for example, a measurement of a current between the at least two measuring electrodes at a predefined voltage and/or a resistance between the at least two measuring electrodes. However, other measured values are also possible in principle.

In particular a result of the first diagnostic measurement, for example at least one diagnostic measured value, may be compared to a first threshold value in method step c). The comparison may, for example, be carried out completely or partially in software, for example with the aid of an appropriate software routine, or also completely or partially in hardware, for example with the aid of a comparator. The method may in particular be designed in such a way that method step c1) is carried out when the result of the first diagnostic measurement is above the first threshold value. A result of the diagnostic measurement may be understood to mean, for example, the at least one diagnostic measured value. In addition, when the result is below the first threshold value, the result may be compared to a second threshold value that is lower than the first threshold value. For example, the diagnostic measured value may include at least one current between at least two measuring electrodes, which is measured, for example, at a predefined voltage immediately after the first regeneration. For example, the first threshold value may be 5 µA, and the second threshold value may be 2 µA. However, other threshold values are also possible. The method may also be carried out in such a way that method step c2) is carried out when the result, for example the diagnostic measured value, is below the second threshold value. The method may also be carried out in such a way that method step c3) is carried out when the result, for example the diagnostic measured value, is between the first threshold value and the second threshold value.

Furthermore, the method may be designed in such a way that the following method step is carried out after carrying out method step c3):

d) carrying out a second diagnostic measurement at the measuring electrode.

The method may be designed in such a way, for example, that method step d) is carried out only when the result of the first diagnostic measurement is between the first threshold value and the second threshold value, for example after carrying out the second regeneration of the sensor element.

The method may also be carried out in such a way that the following method step is additionally carried out:

e) at least one of the following steps is carried out based on a result of the second diagnostic measurement:
    e1) outputting an error message; or
    e2) carrying out a measuring phase for detecting the particles of the measuring gas.

Thus, for example, a result of the second diagnostic measurement, for example a second diagnostic measured value, may be compared to a third threshold value in method step e).

Carrying out method step e1) or e2) may take place, for example, based on the result of this comparison. The comparison may once again be implemented, for example, completely or partially in software and/or completely or partially in hardware. Method step e1) may be carried out, for example, when the result of the second diagnostic measurement, for example the second diagnostic measured value, is above the third threshold value. Method step e2) may be carried out in particular when the result of the second diagnostic measurement, for example the second diagnostic measured value, is below the third threshold value. The third threshold value and the first threshold value may be designed to be equal. However, a different third threshold value is also possible in principle.

In another aspect of the present invention, a sensor for detecting particles of a measuring gas in a measuring gas chamber, in particular soot particles, is provided. The sensor includes at least one sensor element and at least one controller that is connected to the sensor element. The sensor element includes a support and at least one measuring electrode, in particular at least one interdigital electrode, that is connected to the support and that may be exposed to the measuring gas. The controller is configured for carrying out a method according to the present invention, for example according to one or more of the above-described embodiments or according to one or more of the embodiments described in greater detail below.

Within the scope of the present invention, a controller is generally understood to mean a device that is configured for starting, ending, controlling, or regulating one or multiple operations in some other device. The controller may include at least one microcontroller, for example. Alternatively or additionally, however, the controller may encompass other hardware, for example at least one hardware component selected from the group made up of: a comparator, a current source, a voltage source, a current measuring device, a voltage measuring device, a resistance measuring device.

In addition, the sensor may encompass one or multiple additional components. For example, the sensor element may encompass at least one heating device. The heating device may, for example, include at least one thermistor, and the sensor may, for example, encompass at least one current source for acting on the thermistor with a current. The controller may, for example, be connected to the current source, so that the first and/or the second regeneration may be controlled by the controller.

The example method according to the present invention and the example sensor according to the present invention have numerous advantages compared to conventional methods and sensors. In particular, the method according to the present invention is also easy to implement in existing sensors, for example by changing existing software. Thus, for example, a change in the operating strategy while implementing the provided method may take place by appropriately adapting software of a sensor control unit.

The present invention may in particular effectuate an operating strategy of a particle sensor that contributes to increasing a possible number of regeneration cycles, and thus a specifiable service life of the sensor. For example, the first regeneration temperature may generally be selected to be lower than a regeneration temperature that has been customary thus far, for example below 700° C. In conventional sensors, the risk of successive evaporation of electrode metal, for example platinum, may be reduced compared to conventional sensors. However, a complete particle burnoff may still be ensured by utilizing appropriate diagnoses.

As a whole, with the aid of the present invention, for example service lives of much more than 250,000 km may be achieved, which is advantageous in particular in the commercial vehicle sector.

BRIEF DESCRIPTION OF THE DRAWING

Further optional particulars and features of the present invention result from the description below of one preferred exemplary embodiment that is schematically illustrated in the FIGURE.

FIG. 1 shows a schematic flow chart of one exemplary embodiment of a method according to the present invention for operating a sensor element for detecting particles of a measuring gas in a measuring gas chamber.

DETAILED DESCRIPTION OF EXAMPLE EMBODIMENTS

One example of a method according to the present invention for operating a sensor element is described below. The sensor element is configured for detecting particles of a measuring gas in a measuring gas chamber. The method is schematically illustrated in the form of a flow chart in FIG. 1. As an example of one possible sensor element on which the method may be carried out and which may be operated according to the present invention, reference may be made to the sensor elements according to the related art described above, for example German Patent Application No. DE 103 19 664 A1. However, other sensor elements are also possible in principle. For designing a sensor according to the present invention, for example this type of sensor element may be combined with an appropriate controller, also referred to as a sensor controller. An engine control unit may also be correspondingly configured.

The method encompasses a request for a first regeneration in step 110. This regeneration is carried out at a first regeneration temperature, for example 650° C., in step 112. Carrying out a first diagnostic measurement subsequently takes place in method step 114, shunt diagnosis. As a result and first diagnostic measured value, a current between two measuring electrodes may be ascertained at a predefined voltage of approximately 45 V to 46 V, for example. An evaluation of the result of the first diagnostic measurement takes place in method step 116. For example, the first diagnostic measured value may be compared to a first threshold value, so that a query may be made, for example, as to whether the first diagnostic measured value is above the first threshold value, for example above 5 µA. If this is the case, which is denoted by branch "y" in FIG. 1, for example an error message may be output in method step 118. If this is not the case, which is denoted by branch "n" in FIG. 1, for example a further query may take place in method step 120.

Within the scope of the present invention, in a comparison to threshold values and the query as to whether a certain value is greater or smaller than a threshold value, the threshold value itself is generally to be added to in one range, or alternatively, the other range. For example, if a query is made as to whether a value is greater than a threshold value, this may include the query ">" or also "≥". Similarly, for example, if a query is made as to whether a value is smaller than a threshold value, this may encompass the query "<" or also "≤". For a query as to whether a value x is between two threshold values a, b, this may contain the query "a<x<b", "a≤x<b", "a<x≤b", or "a≤x≤b".

In the further query in method step 120, for example an inquiry may be made as to whether the result of the first diagnosis is between a first threshold value and a second threshold value. For example, the second threshold value may be 2 µA. If this is not the case, which is denoted as branch "n" in FIG. 1, a measuring phase 122 may be carried out in which a particle concentration, for example, may be determined. However, if this is the case, i.e., the result of the first diagnostic measurement is between the first threshold value and the second threshold value, which is denoted by branch "y" in FIG. 1, a second regeneration at a second regeneration temperature, for example 785° C., may be requested and carried out in step 124.

A second diagnostic measurement, which may be carried out, for example, analogously to the first diagnostic measurement, may subsequently take place in step 126. In turn, a query as to whether the result of the second diagnosis is above a third threshold value takes place in method step 128. The third threshold value may, for example, be selected to be equal to the first threshold value, for example 5 µA. If the query is positive, which is denoted by branch "y" in FIG. 1, i.e., the result of the second diagnostic measurement is above the third threshold value, for example an error message may be output in method step 130. If the query is negative, which is denoted by branch "n" in FIG. 1, i.e., the result of the second diagnostic measurement is below the third threshold value, for example a measuring phase may be carried out in method step 132, which may have an analogous design to the measuring phase in method step 122.

A genuine, unadulterated particle measurement, for example, may be ensured with the aid of the method illustrated in FIG. 1.

Whereas in one-step methods, in which only a single regeneration is carried out, high regeneration temperatures are generally used at which the sensor element is held for a certain time, for example, the present method is based on a low initial first regeneration temperature that is preferably lower than the second regeneration temperature. This is based on the finding that in many cases, low regeneration temperatures are sufficient for a successful regeneration. However, the subsequent queries and optionally the second regeneration still ensure that, in the event of an excessively high particle load after the first regeneration, this may be followed, if needed, by a second regeneration which may have a correspondingly more intensive design. In this way, in the normal case the sensor element may be preserved, whereas a more intensive regeneration may be carried out if necessary.

For the diagnostic measurements, for example the sensor element may not be heated for a longer time after the preceding regeneration. The sensor element may then cool, for example, to the surrounding gas temperature, for example, the surrounding exhaust gas temperature, for example. For example, after falling below a predefined temperature threshold a measuring voltage may be switched on for the diagnosis, and a shunt diagnosis may be carried out shortly afterward. The diagnostic measurement may then check, for example, whether a measurable current is already flowing across the one or multiple measuring electrodes at the start of the measurement. If this current exceeds a certain first threshold value during the first diagnostic measurement, a corresponding error may be transmitted to an error monitor, for example.

A measurable current already present at the start of the measurement, i.e., immediately after a regeneration, generally indicates that electrically conductive particles that could not be burned off by the preceding regeneration have accumulated on the at least one measuring electrode, for example the interdigital electrode. For example, metallic contaminants that may cause a shunt of >5 µA may be indicated by the diagnosis.

In the modification according to the present invention of the operating strategy according to FIG. 1, in particular use may still be made of the fact that a successful regeneration generally always takes place, for example at high regeneration temperatures and a second regeneration temperature of 785° C., as well as under extreme conditions. However, this finding, in conjunction with a regeneration control, may allow exclusion of these extreme conditions and may significantly lower a typical regeneration temperature. Thus, in the normal case the first regeneration temperature may be significantly reduced, for example to 690° C., with respect to the second regeneration that is carried out only in the extreme case. This first regeneration temperature may in particular be selected in such a way that in approximately 90% of the typical operating points in the field it is sufficient to completely burn off the coating, for example soot, present on the at least one measuring electrode. For use in the CV range, this may mean, for example, that the first regeneration temperature is selected in such a way that it is sufficient to ensure a successful regeneration in an operating point of the engine with maximum exhaust gas velocity, but with the exhaust gas temperature not yet representing a worst case. With simultaneously low temperatures, a regeneration in this case would generally not be successful. However, this case seldom occurs, since typically high exhaust gas velocities, for example in a full load point, are generally accompanied by high exhaust gas temperatures.

Via a shunt diagnosis in step 114, a check may be made, for example at the start of a measuring phase, as to whether the first regeneration has been successful and whether complete burnoff of the coating, for example the soot, has occurred. In addition to the limit of 5 µA, for example, that is predefined by the first threshold value, a check may be made as to whether a limit of 2 µA, for example, that is predefined by the second threshold value is exceeded. If this second threshold value is not exceeded, the measuring phase may normally be continued. In contrast, if the diagnostic measured value is between the first threshold value and the second threshold value, for example between 5 µA and 2 µA, it may generally be assumed that the first regeneration was not successful and that, for example, soot is still present on the interdigital electrode. In this case, preferably no error is transmitted to the error monitor, and instead the second regeneration is carried out at the preferably higher second regeneration temperature, for example 785° C. If a diagnostic value of <2 µA is present after the second regeneration, the measuring phase is normally continued, and likewise when the diagnostic value is once again between 2 µA and 5 µA. In contrast, if the diagnostic value has a value >5 µA, a corresponding error is transmitted to the error monitor.

This discussion generally indicates that the measuring phases in method steps 122, 132 may also be completely or partially identical. In addition, the particular measuring phase may also completely or partially be a continuation of the particular diagnostic measurements in steps 114 and 126. Thus, for example, a defined initial phase of a measuring phase may be utilized as the particular diagnostic measurement. The measurement may be interpreted as a measuring phase having valid values only after a successful query according to method steps 122, 132.

What is claimed is:

1. A method for operating a sensor element for detecting particles of a measuring gas in a measuring gas chamber, the sensor element including a support and at least one measuring electrode that is connected to the support and that is exposed to the measuring gas, the method comprising:
   a) carrying out a first regeneration of the sensor element at a first regeneration temperature;
   b) carrying out a first diagnostic measurement at the measuring electrode; and
   c) carrying out the following steps based on a result of the first diagnostic measurement:
      c1) outputting an error message when the result of the first diagnostic measurement is above a first threshold value;
      c2) carrying out a measuring phase for detecting the particles of the measuring gas when the result of the first diagnostic measurement is below a second threshold value; and
      c3) carrying out a second regeneration of the sensor element at a second regeneration temperature when the result of the first diagnostic measurement is between the first threshold value and the second threshold value.

2. The method as recited in claim 1, wherein the second regeneration temperature is higher than the first regeneration temperature.

3. The method as recited in claim 1, wherein a result of the first diagnostic measurement is compared to a first threshold value in method step c) method step c1) being carried out when the result is above the first threshold value.

4. The method as recited in claim 3, wherein when the result is below the first threshold value, the result is compared to a second threshold value that is lower than the first threshold value.

5. The method as recited in claim 4, wherein the following method step is carried out after carrying out method step c3):
   d) carrying out a second diagnostic measurement at the measuring electrode.

6. The method as recited in claim 5, wherein the following method step is additionally carried out:
   e) at least one of the following steps is carried out based on a result of the second diagnostic measurement:
      e1) outputting an error message; or
      e2) carrying out a measuring phase for detecting the particles of the measuring gas.

7. The method as recited in claim 6, wherein a result of the second diagnostic measurement is compared to a third threshold value in method step e), method step e1) being carried out when the result is above the third threshold value, and method step e2) being carried out when the result is below the third threshold value.

8. A sensor for detecting particles of a measuring gas in a measuring gas chamber, comprising:
   at least one sensor element; and
   at least one controller that is connected to the sensor element, the sensor element including a support and at least one measuring electrode that is connected to the support and that is exposed to the measuring gas, the method comprising:
   a) carrying out a first regeneration of the sensor element at a first regeneration temperature;
   b) carrying out a first diagnostic measurement at the measuring electrode; and
   c) carrying out the following steps based on a result of the first diagnostic measurement:
      c1) output an error message when the result of the first diagnostic measurement is above a first threshold value;
      c2) carrying out a measuring phase for detecting the particles of the measuring gas when the result of the first diagnostic measurement is below a second threshold value; and
      c3) carrying out a second regeneration of the sensor element at a second regeneration temperature when the result of the first diagnostic measurement is between the first threshold value and the second threshold value.

* * * * *